United States Patent [19]
Currier

[11] 3,981,471
[45] Sept. 21, 1976

[54] HANGER DEVICE

[76] Inventor: Robert F. Currier, 4129 Horton Road, Jackson, Mich. 49201

[22] Filed: Aug. 20, 1975

[21] Appl. No.: 606,307

[52] U.S. Cl. .............................. 248/317; 248/360; 294/86.24; 294/93
[51] Int. Cl.² .................. A47J 51/142; A47F 5/00; A47J 5/00
[58] Field of Search .................. 248/317, 359, 360; 294/86.24, 93, 340

[56] References Cited
UNITED STATES PATENTS

| | | | |
|---|---|---|---|
| 1,572,983 | 2/1926 | Barrier | 294/86.24 |
| 1,734,807 | 11/1929 | Herman | 294/86.24 |
| 1,879,161 | 9/1932 | Frambach et al. | 294/93 UX |
| 2,719,374 | 10/1955 | Paione | 248/317 X |
| 3,891,176 | 6/1975 | Downing et al. | 248/340 |

Primary Examiner—J. Franklin Foss
Attorney, Agent, or Firm—Richard D. Emch

[57] ABSTRACT

A single-piece hanger is disclosed. The hanger comprises a single piece of resilient metal formed in an generally "J" shape and defining opposing legs, joined at a closed end of the J by a bend from which the opposing legs extend at angles from one-another. Retaining teeth adjacent the closed end are defined on the opposing legs. Handles for gripping the hanger are also on each opposing leg. The opposing handles are gripped to compress the legs together. After the legs are compressed the closed end and the retaining teeth are placed within a work piece such as tubing or piping. The handles are released permitting the resilient hanger to return the legs from a closed position toward an open position; resiliently carrying the retaining teeth into gripping contact with the work piece. Means are provided for maintaining the closed end intact against distorting forces applied through compressing the opposing legs. Means are also provided for limiting the maximum extent to which the hanger can be inserted within a tubular work piece.

5 Claims, 4 Drawing Figures

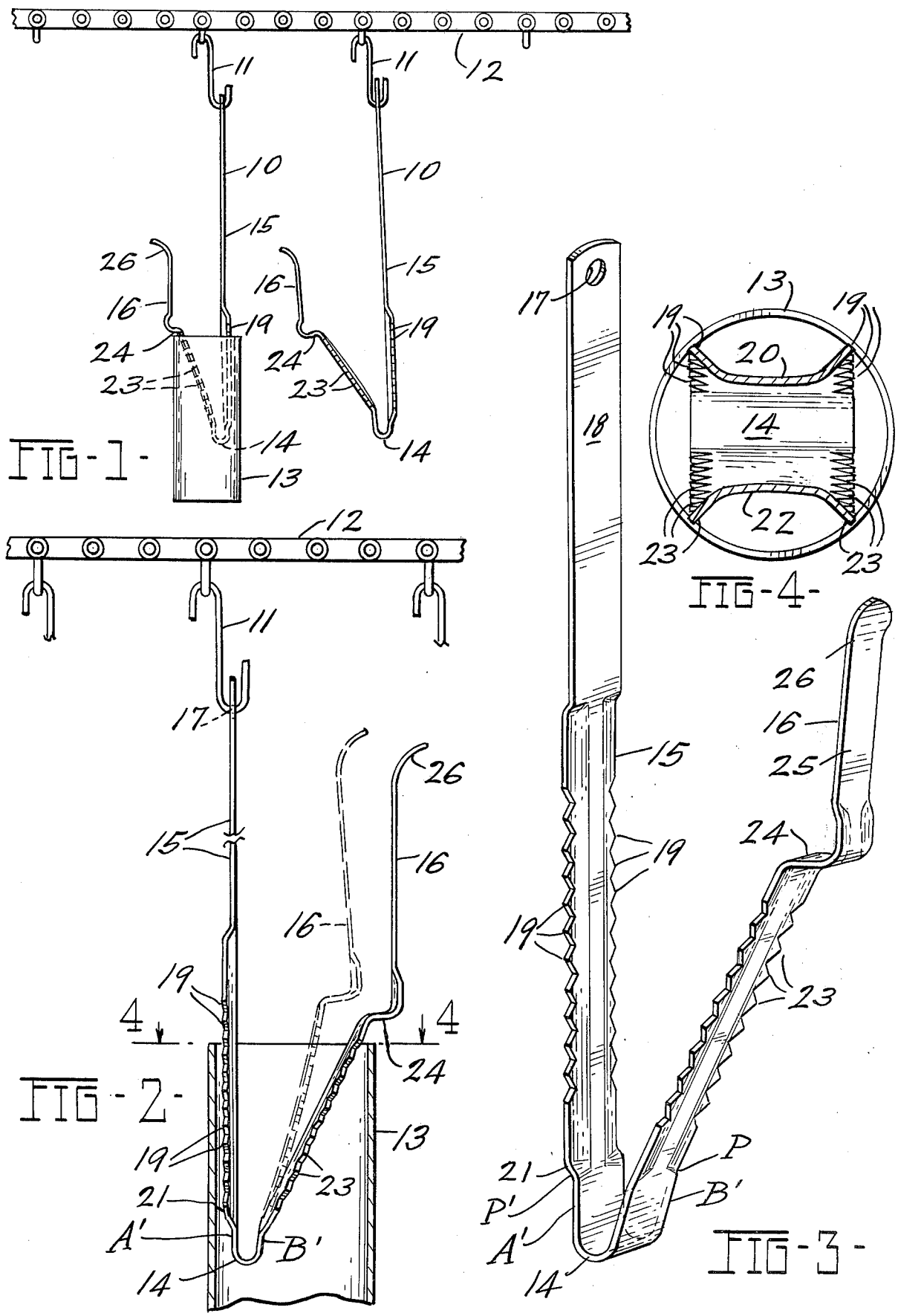

HANGER DEVICE

BACKGROUND OF THE INVENTION

The present invention relates to a durable, single-piece hanger for use in applying an electrostatic powder coating to tubular objects such as automotive exhaust components. Electrostatic powder coating comprises the application of electrostatically-charged coating particles to target work pieces having an opposite electrostatic charge. The coating powder which is applied in the process is extremely fine and carries easily within a coating booth to facilitate uniform coating of the target work pieces.

Typical powder coating apparatus for use in coating tubular exhaust components comprises a moving chain conveyor for carrying target components past stationary powder spray heads within a coating booth. It has been common practice to use conventional vice grips for attaching the tubing target to hooks depending from a chain conveyor. The jaws of the vice grips are clamped over a wall of the tubular component to be sprayed and a handle of the grip is then attached to a conveyor hook for carrying the component through the spray booth.

Because the vice grip is thus attached to the target component it necessarily carries the same electrostatic charge as the component. The result is that when the vice grip, carrying the tubular component, passes in front of the spray head the grip is uniformly coated with the powder, as is the target component.

In mass production operations, wherein the vice grip tube hanger is reused hundreds of times during a single day's production, the conventional vice grip suffers a powder build-up inside of its working components which eventually causes it to fail. Repair or replacement of the vice grips—especially on a mass assembly basis—is costly and time consuming.

The hanger of the present invention was designed to overcome the problems caused by the vice grips as used in an electrostatic coating process. The hanger is one-piece construction and is shaped in a novel manner in order to preclude failures even after thousands of uses in the coating process.

SUMMARY OF THE INVENTION

The invention comprises a single-piece hanger for tubular objects. The hanger is a generally J shape, defining a long support leg on one side of the J and a shorter compressible leg on an opposite side of the J. Extreme ends of the open end of the J define gripping areas; the compressible leg having a defined handle portion which extends outwardly from a lower area of the compressible leg to provide a stop abutment for limiting the extent of insertion of the hanger within a tubular work piece. A hole in the opposite support leg provides means for attaching the hanger to a hook on, for example, a conveyor. Retaining teeth on each leg, adjacent a closed end of the J provide means for gripping an interior wall of a tubular work piece. The base of the J, from which the shorter compressible leg extends, projects away from the support leg at a first angle, which angle imparts a uniform but relatively acute bend to the J base, and then at a second relatively more oblique angle with respect to the support leg, whereby compression of the compressible leg toward the support leg is effected without stressing the closed-end bend of the J shape.

BRIEF DESCRIPTION OF THE DRAWINGS

FIG. 1 is a side view of hanger devices of the present invention in place on a moving conveyor;

FIG. 2 is a side view of a hanger of the present invention hanging from a moving conveyor and within a work piece;

FIG. 3 is a perspective view of a hanger of the present invention; and

FIG. 4 is a top view of the hanger of the present invention taken along line 4—4 of FIG. 2.

DESCRIPTION OF THE PREFERRED EMBODIMENT

Referring to FIG. 1, hanger devices 10 of the present invention are shown attached to hooks 11 of a moving conveyor 12. A tubular, hollow work piece 13 is in place on one of the hangers 10 as will be explained below.

As best seen in FIG. 3, the hanger 10 comprises a single-piece resilient member defining a generally J shape, of any compressible spring material such as iron. The lower-most end of the hanger 10 is defined by a U-shaped bend having a first side A' and a second side B' from which extend two legs: a support leg 15 and a compressible locking leg 16. A hole 17 in an upper-most extremity of the support leg 15 defines means for attaching the hanger device 10 to the hooks 11. The upper-most portion of the support leg 15 defines a smooth gripping handle 18 while the lower-most area of the support leg 15 defines oppositely extending rows of pointed teeth 19 for retaining an interior wall of a work piece 13. It has been found that the oppositely extending teeth 19 work most advantageously when the rows of teeth extend from a point adjacent the side A' to from ⅛ to ½ of the distance up the leg 15 to a point adjacent the handle 18.

As is best seen in FIG. 4, the rows of teeth 19 on the leg 15 are spaced apart and supported by a section 20 of the leg 15 which is dished toward the opposite leg 16 to impart an outward pitch to the pointed teeth 19 connected to the dished section 20.

A flare 21 adjacent the teeth 19 joins the leg 15 to the side A' for imparting strength and rigidity to the end 14 when the hanger device 10 is compressed as will be explained below.

The U-shaped closed end 14 comprises a bend in which the sides A' and B' are approximately parallel. The locking leg 16 projects from the side B' of the closed end 14 at an angle with respect to the side B' to carry the locking leg 16 at approximately a 45° angle to the support leg 15.

A second dished section 22 on the locking leg 16 extends from a point adjacent the side B' upwardly along the locking leg 16. The second dished section is dished along its edges toward the opposite leg 15. A second row of pointed teeth 23 extends from the dished section 22 which imparts an outward pitch to the teeth 23 away from the center line of the hanger in a direction opposite that of the teeth 19 on the support leg 15 as is best seen in FIG. 4.

A stop flare 24 extends from the leg 16 at a point above the dished section 22 and extends outwardly from the dished section 22 at approximately a 90° angle with respect to the leg 15. This stop flare 24 defines the maximum length of insertion of the hanger device within a tubular work piece as will be explained below.

A compression handle 25 extends from the stop flare 24 in a direction parallel to the dished section 22 for gripping and compression of the hanger 10 as will be explained. A gripping flare 26 is defined by the compression handle 25 for facilitating compression of the locking leg 16 toward the support leg 15.

The operation of the hanger 10 is as follows. With the hanger in a first, non-compressed condition, the handles 18 and 25 are gripped in an operator's hand. The compression handle 25 is then moved toward the handle 18; compressing the locking leg 16 toward the support leg 15. The end 14 of the hanger is then inserted into an open end of the tubular work piece 13, as is shown in FIG. 2. The hanger 10 can be inserted into the work piece 13 only as far as the stop flare 24 which projects over the open end of the work piece 13. The handles 18 and 25 are then released, permitting the resilient hanger 10 to expand outwardly toward its non-compressed condition, bringing the oppositely-outward-pitched teeth 19 and 23 into gripping contact with portions of an inner wall of the tubular member 13. The resiliency of the single-piece hanger 10 causes the teeth 19 and 23 to be urged outwardly against the work piece 13 walls with sufficient force to lock the hanger 10 in place within the work piece 13. The hanger 10 is then placed on the hook 11 by means of the hole 17 defined in the support leg 15.

When it is desired to remove the work piece 13 from the conveyor 12, the support leg 15 is simply removed from the hook 11, the legs 15 and 16 are again compressed together as explained above and the hanger 10 is removed from the work piece 13.

Referring especially to FIG. 2, the flare 21 and the 45° angle of the dished section 22 of the locking leg 16 provide pivot points P and P' from which the legs 15 and especially 16 can be resiliently compressed toward oneanother. These pivot points P and P' are above the sides A' and B' of the closed end, thus preventing these sides (A' and B'), as well as the U-shape of the closed end, from distorting or compressing when the legs 15 and 16 are compressed together as described above.

The provision of a non-compressible closed end 14 on the hanger 10 significantly adds strength and durability to the hanger. This is because the severity of the bend of the resilient metal at the closed end 14 renders the closed end 14 weak and subject to failure under stress. Therefore, if the side walls A' and B' are permitted to compress along with the legs 15 and 16, the U-bend area of the closed end 14 would be subject to sufficient stress and strain to cause the hanger to split at the bend.

The hanger 10 of the present invention thereby provides an inexpensive and easily operated hanger device which engages the tubular work pieces positively and securely for transportation on a moving conveyor. At the same time the various structural features of the hanger 10, described above, provide an extremely durable hanger capable of being used thousands of times in connection with a mass production manufacturing operation.

It is to be understood that the embodiments of the invention thus described are illustrative of the hanger of the present invention and are not to be interpreted as limiting the scope and effect of the following claims:

What I claim is:

1. A hanger for engaging and supporting tubular objects comprising a resilient, single piece member defining a U-shaped closed end and opposing arms extending from said closed end, a retaining portion on each of said arms adjacent said closed end, retaining teeth defined along each of said retaining portions, a handle portion on each of said arms extending away from said retaining portions, said retaining portions extending from said closed end in a diverging, nonparallel relationship, whereby said closed end is placed within the tubular object by gripping said handle portions and compressing said arms and whereby both handle portions remain exterior of the tubular object upon release of said handle portions.

2. A work piece hanger comprising a resilient single-piece member having opposed open ends and an opposite closed end defining opposing handle means on said open ends of said member, retaining means adjacent a lower closed end of said member, and hanger means on at least one of said open ends, said hanger being compressible from a first open position to a second closed position and resiliently openable from said second closed position to said open position for urging said retaining means into gripping contact with the interior of a work piece, and means adjacent said lower closed end for maintaining said closed end in a non-deformable condition, said non-deformation means comprising a first side portion and a second side portion extending away from said closed end at first angles with respect to said closed end, each of said side portions joining a lower portion of one of said oppositely extending open ends at second angles whereby said lower portions of said open ends extend outwardly from said first and second side portions, said second angle defining pivot means about which each of said open ends is movable from said first and second positions above said closed end.

3. A work piece hanger according to claim 2 wherein said retaining means comprises laterally spaced-apart teeth extending along said member adjacent said lower closed end.

4. A work piece hanger according to claim 2 wherein said retaining means comprise oppositely-extending curvilinear wall means defined by said member tooth means extending from said wall means whereby said tooth means are urged outwardly into locking contact with the interior of the work piece upon movement of said hanger toward said first open position.

5. A work piece hanger according to claim 2 wherein said hanger means comprises a slot defined within at least one of said open ends.

* * * * *